US012662395B2

(12) United States Patent
Lang et al.

(10) Patent No.: US 12,662,395 B2
(45) Date of Patent: Jun. 23, 2026

(54) FILTRATION DEVICE

(71) Applicant: BRITA SE, Taunusstein (DE)

(72) Inventors: Uwe Lang, Taunusstein (DE); Sabine Lang-Dress, Taunusstein (DE)

(73) Assignee: BRITA SE, Taunusstein (DE)

( * ) Notice: Subject to any disclaimer, the term of this patent is extended or adjusted under 35 U.S.C. 154(b) by 275 days.

(21) Appl. No.: 18/260,897

(22) PCT Filed: Dec. 16, 2021

(86) PCT No.: PCT/EP2021/086174
§ 371 (c)(1),
(2) Date: Jul. 10, 2023

(87) PCT Pub. No.: WO2022/152497
PCT Pub. Date: Jul. 21, 2022

(65) Prior Publication Data
US 2024/0059584 A1      Feb. 22, 2024

(30) Foreign Application Priority Data

Jan. 15, 2021     (DE) ..................... 10 2021 100 759.3

(51) Int. Cl.
*C02F 1/00* (2023.01)
*C02F 1/42* (2023.01)
(52) U.S. Cl.
CPC .............. *C02F 1/008* (2013.01); *C02F 1/003* (2013.01); *C02F 1/42* (2013.01); *C02F 2201/004* (2013.01); *C02F 2201/006* (2013.01); *C02F 2209/001* (2013.01); *C02F 2209/05* (2013.01); *C02F 2209/10* (2013.01); *C02F 2209/42* (2013.01)

(58) Field of Classification Search
CPC ...... B01D 27/08; B01D 35/143; B01D 37/04; C02F 1/003; C02F 1/008; C02F 1/283; C02F 1/42; C02F 2201/004; C02F 2201/006; C02F 2209/001; C02F 2209/003; C02F 2209/005; C02F 2209/05; C02F 2209/055; C02F 2209/10; C02F 2209/15; C02F 2209/29; C02F 2209/42; C02F 2209/445; C02F 2307/04
See application file for complete search history.

(56) References Cited

U.S. PATENT DOCUMENTS

| | | | |
|---|---|---|---|
| 4,683,054 | A | 7/1987 | Turnbull |
| 2005/0229699 | A1 | 10/2005 | Chai et al. |

FOREIGN PATENT DOCUMENTS

| | | | |
|---|---|---|---|
| DE | 102008054479 A1 | 6/2010 |
| EP | 1230166 B1 | 8/2004 |
| EP | 1484097 A1 | 12/2004 |
| EP | 1589325 A2 | 10/2005 |
| EP | 1490302 B2 | 12/2012 |

(Continued)

*Primary Examiner* — Dirk R Bass
(74) *Attorney, Agent, or Firm* — Colson Law Group, PLLC

(57) ABSTRACT

The present invention relates to a filtration device comprising an inlet funnel with a cartridge seat, a filter cartridge placeable in the cartridge seat, and a sensing apparatus comprising sensing means for measuring at least one water characteristic. The sensing apparatus comprises an electrical circuit with a control gap and the filter cartridge comprises a bridging element, wherein the bridging element is arranged such that it electrically closes the control gap when the filter cartridge is located in the cartridge seat.

10 Claims, 5 Drawing Sheets

(56)        References Cited

FOREIGN PATENT DOCUMENTS

Figure 1A:
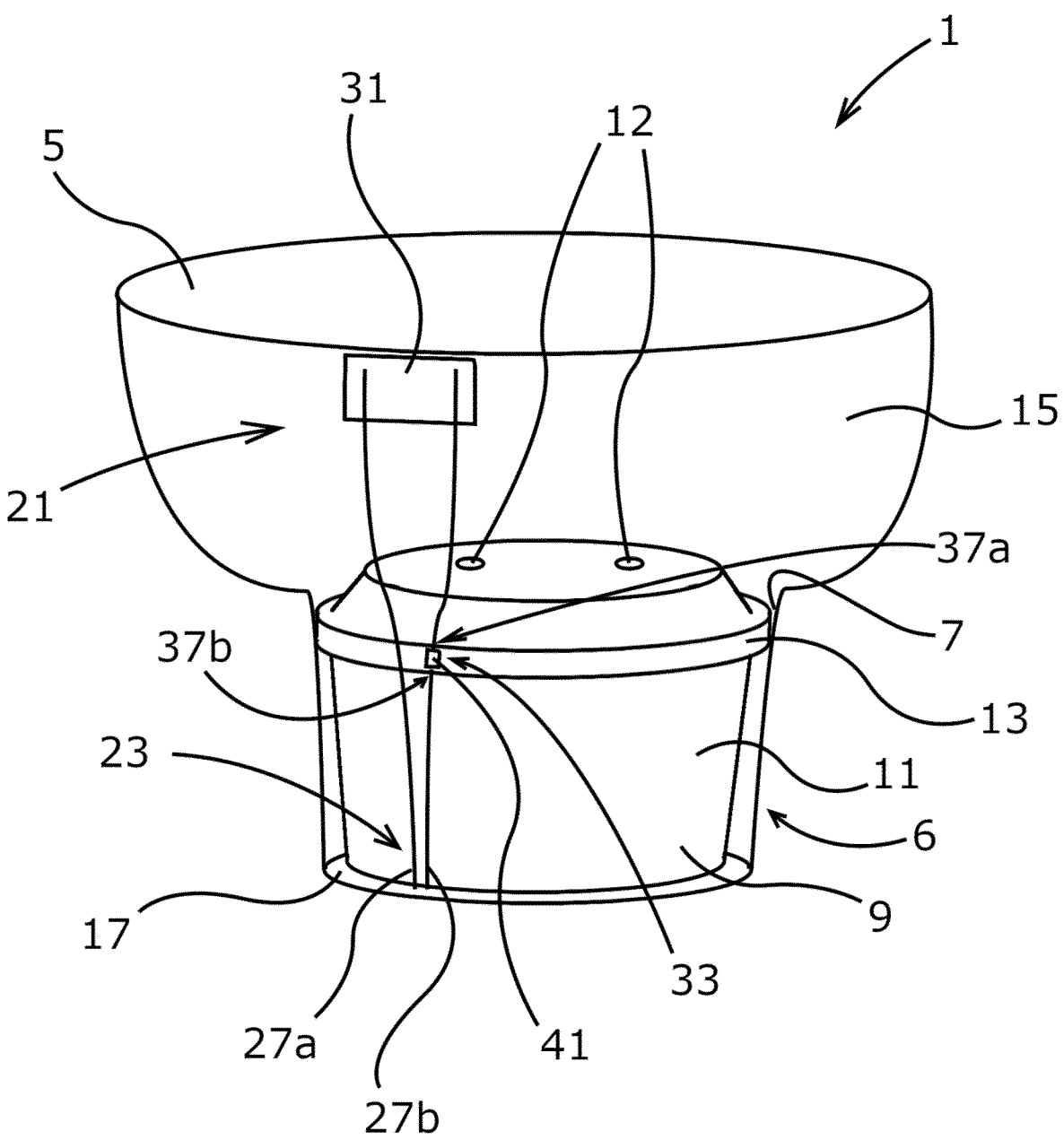

| | | | |
|---|---|---|---|
| JP | 2005331508 | A | 12/2005 |
| RU | 2669276 | C1 | 10/2018 |
| WO | 03084875 | A1 | 10/2003 |
| WO | 2009/090678 | A1 | 7/2009 |

FILTRATION DEVICE

The present invention relates to a filtration device, a filter cartridge, a filtration assembly, and a method for operating a sensing apparatus in a filtration device.

Filtration devices can be used as water filters for everyday use in households, which is why they are also called table water filters. They are primarily used for clearing tap water of unwanted substances. Among these substances are chlorine and hardness builders such as calcium and magnesia, but also lead, which finds its way into tap water through the use of lead pipes, especially in older houses.

Table water filters are often gravity-operated. Besides the pouring of the water, which is to be treated, into the water filter, no work is necessary for filtering the water. The water simply flows downwards through a filter cartridge and into a receptacle for the filtered water due to the gravitational force.

A filtration device known from EP 1 230 166 B1 comprises an inlet funnel having a bottom wall, which is provided with an opening for a filter cartridge. The filter cartridge is plugged into the opening, creating a seal between the opening and a sealing rim of the filter cartridge. In use, water is introduced into the inlet funnel from above and then flows into the filter cartridge through water inlets. Granular treatment media for the water is located inside of the filter cartridge. The treatment media usually comprises ion exchange resin and/or active coal, but other components may be used as treatment media as well. In the filter cartridge the water is treated and then exits the filter cartridge downwards through water outlets at the bottom of the filter cartridge. The treated water is also called filtrate. The filter cartridge is also provided with air outlets at its very top in order to allow air from inside the filter cartridge to exit the filter cartridge upwards at the beginning of the filtration process.

Over time, the effectiveness of the treatment media deteriorates. At a certain point, the treatment media is used up. To determine such a state it has been proposed to provide sensing means for measuring the conductivity of the water present in the filtration device. The conductivity of the water changes when it is treated: treated water is less conductive due to the ion exchange that occurs during treatment. In EP 1 490 302 B2 it is proposed to measure both the water that is to be filtered (feed water) and the filtrate as well as the volume already treated by the cartridge. These characteristics make it possible to determine how much matter has been absorbed or exchanged by the treatment inside the cartridge.

DE 10 2008 054 479 A1 also proposes measuring the water conductivity both in the feed water and in the filtrate, but the measurements are only used in order to determine the filling levels.

For measuring the conductivity or other characteristics of water, a power source is required. Since table water filters are generally supposed to operate without being connected to an external power source or the national grid, an internal power source such as a battery is used. As disclosed in EP 1 490 302 B2 the battery may be implemented as part of the filter cartridge together with the conductivity sensing unit. Such a cartridge is expensive and thus undesirable.

DE 10 2008 054 479 A1 discloses a sensing unit that is independent of the filter cartridge. The sensing unit comprises its own power source. While this reduces the cost of manufacturing the filter cartridges, such a solution has another disadvantage: if the sensing unit is active all the time the power source is drained quickly. The user therefore has to exchange not only the filter cartridge but the power source (battery) on a regular basis.

It is therefore the object of the invention to provide a more sophisticated sensing unit for measuring water characteristics within a filtration device.

The object of the invention is achieved by a gravity-operated filtration device according to claim 1.

The filtration device comprises an inlet funnel with a cartridge seat, a filter cartridge placeable in the cartridge seat, and a sensing apparatus comprising sensing means for measuring at least one water characteristic. The filtration device is characterised in that the sensing apparatus comprises an electrical circuit with a control gap and the filter cartridge comprises at least one bridging element, wherein the bridging element is arranged such that it electrically opens or closes the control gap, i. e. opens a short circuit initially present within the electrical circuit of the sensing apparatus or closes the initially open electrical circuit of the sensing apparatus, when the filter cartridge is located in the cartridge seat.

The sensing apparatus in its idle state may provide an open electrical circuit that can be closed (bridged) by the filter cartridge being correctly seated in the cartridge seat. The sensing apparatus in its idle state may alternatively provide a short circuit that can be opened by the filter cartridge being correctly seated in the cartridge seat. Both alternatives ensure that the sensing apparatus is only operable when the filter cartridge is placed correctly in the cartridge seat.

The inventors have found it to be advantageous if the sensing device only operates if a filter cartridge is present in the filtration device. Without the filter cartridge, operating the sensing device is a waste of energy, even if water is present in the filtration device. Thus, it is most preferable if the bridging element closes the control gap. When there is no filter cartridge present in the cartridge seat, the electrical circuit is not closed and the power source is not drained thus extending its lifetime. Only when a filter cartridge with a bridging element is placed in the cartridge seat the electrical circuit is closed and the sensing apparatus is operable. The activity of the sensing apparatus is thus also initiated automatically when a filter cartridge is placed in the inlet funnel, such that the user does not have to separately initiate said activity. This facilitates the use of the inventive filtration device. The sensing apparatus is preferably fixed to or at least partially manufactured integrally with the inlet funnel.

The electrical circuit may comprise more than one control gap. The sensing apparatus may comprise more than one electrical circuit, each having at least one control gap.

The filtration device is preferably gravity-operated. Alternatively, it may also be operated by a manual or (semi-) automatic pump or press.

The filtration device preferably comprises a receptacle into which the inlet funnel can be placed. The receptacle collects the water treated inside the filter cartridge, which flows out of the inlet funnel downwards into the receptacle. The receptacle can come in many shapes, such as a carafe or a box-like container.

The filter cartridge preferably comprises a casing, in which water treatment media is arranged. The water treatment media preferably comprises ion exchange resin and/or active coal. The casing is preferably formed from at least two parts so that the treatment media can be entered into the casing easily. The filter cartridge and the cartridge seat are preferably complementary such that they provide a sealing against water flowing around the filter cartridge and such that they act together to open or close the control gap when the filter cartridge is placed in the cartridge seat. Preferably, one of the parts of the casing comprises a circumferential sealing rim, which creates a seal together with a sealing surface of the cartridge seat when the filter cartridge is placed in the inlet funnel ensuring that water flows only into and not around the filter cartridge. The casing preferably has at least one water inlet at its top and at least one water outlet at its bottom.

The bridging element preferably comprises an electrically conductive element for electrically closing the control gap. This way the bridging element itself is configured such that it electrically closes the control gap. In such embodiments, the sensing apparatus may have two connection points located at the cartridge seat and set at a distance from one another, which define the control gap. The conductive element is then configured such that it contacts both connection points when the filter cartridge is placed in the cartridge seat. This way the control gap is directly closed by the bridging element. Preferably, the conductive element or the bridging element in general is located in or on the sealing rim of the filter cartridge. Since the sealing rim contacts the inlet funnel at the sealing surface anyways, it makes for an ideal location for the bridging element. This way, creating a further contact point between the filter cartridge and the inlet funnel, which could possible limit the sealing capability of the seal created by the sealing rim and the sealing surface, can be avoided.

Several parts of the filtration device are preferably made of polymer, such as the inlet funnel, the casing of the filter cartridge and the receptacle. The conductive element can be formed from metal as well, but most preferably the conductive element comprises or is entirely formed of conductive polymer. This way the conductive element can be adapted easily to the form of the inlet funnel or preferably manufactured in one piece, in particular by injection-moulding, with at least one part of the filter cartridge, in particular with the sealing rim.

In other embodiments the inlet funnel comprises a conductive element for electrically opening or closing the control gap and in that the bridging element is configured to act on the conductive element when the filter cartridge is located in the cartridge seat such that the conductive element opens or closes the control gap.

This way, no conductive element has to be present in the filter cartridge, making its manufacturing cheaper. According to one embodiment the control gap is opened by the filter cartridge when a short circuit is present in the idle state. In this embodiment the closed control gap in the idle state bypasses the sensing means so that no water characteristic can be measured unless the filter cartridge is correctly seated in the cartridge seat. According to another embodiment the control gap is closed by the filter cartridge if the control gap is open in the idle state. In this embodiment the open control gap in the idle state breaks the circuit which also does not allow the sensing means to measure a water characteristic unless the filter cartridge is correctly seated in the cartridge seat. The bridging element can for example be a pin or a rib. The conductive element may once more comprise metal and/or conductive polymer. The bridging element preferably protrudes from the casing.

The conductive element in such embodiments is preferably included in a mechanical switch configured to open and close the electrical circuit, wherein the bridging element is configured to act on the mechanical switch such that the switch is opened or closed when the filter cartridge is located in the cartridge seat. The switch is opened by the bridging element when a short circuit is present in the idle state of the sensing apparatus and the switch is closed by the bridging element if the control gap is open in the idle state. For example, if the bridging element is a pin, the inlet funnel can comprise a hole, into which the pin enters and at the bottom of which the switch is located. When the filter cartridge is placed in the cartridge seat, the pin enters into the hole and presses onto the mechanical switch thus opening or closing it and with it the electrical circuit.

In some preferred embodiments, the sealing rim of the filter cartridge is n-fold rotationally symmetrical about a main vertical axis of the filter cartridge and comprises n bridging elements arranged symmetrically on the sealing rim with regard to the vertical axis, with $n \geq 2$. In particular, $n < \infty$, thus excluding a circular form.

Such a configuration makes it easy for the user to enter the filter cartridge into the cartridge seat correctly, meaning that the filter cartridge is entered such that the bridging elements open or close the control gap(s) of the electrical circuit(s). Most preferably, the sealing rim is two-fold rotationally symmetrical about the main axis of the filter cartridge and comprises two bridging elements.

In other preferred embodiment, the sealing rim of the filter cartridge is rotationally asymmetrical about its main vertical axis. In particular, the sealing rim and the sealing surface are configured such that the filter cartridge can be placed in the cartridge seat in only one operable position. With the invention it is important that the bridging element is arranged precisely at the control gap, which is ensured by the asymmetrical configuration. Most preferably the filter cartridge has an asymmetric element, such as a protrusion or a bump, which more preferably comprises the bridging element. This ensures even more that the bridging element is in the right place when the filter cartridge in placed in the inlet funnel. The asymmetric element is most preferably located at the sealing rim.

The sensing apparatus is preferably configured to measure at least one of a filling level, water conductivity, total dissolved solids (TDS), the level of calcium (Ca), magnesium (Mg), sodium (Na), potassium (K), chloride, nitrates, sulphates, copper (Cu), and other elements or minerals, in particular main and trace ions commonly present in tap water, or a combination thereof.

The sensing apparatus preferably comprises a control unit and a power source. The sensing apparatus may further comprise a display or other means of outputting a signal, such as an LED or LCD.

The sensing apparatus preferably comprises at least two separate sensing means, in particular n separate sensing means, wherein at least one of the sensing means is operable only when the control gap is opened or closed in accordance with the two alternatives of the invention, respectively. Providing two or more sensing means makes it possible to either measure several of the water characteristics mentioned above or to measure a certain characteristic twice or more, preferably once in the feed water and once in the filtrate. Accordingly, one of the sensing means is preferably configured to measure above the sealing surface and another one of the sensing means is preferably configured to measure below the sealing surface. In other words, one of the sensing means is preferably arranged in the inlet funnel above the sealing surface and one of the sensing means is preferably arranged in the inlet funnel below the sealing surface or in the receptacle. In such embodiments, the filter cartridge may also comprise at least two bridging elements, one for each sensing means. Although in general in all gravity-operated filtration devices the unfiltered water is retained by the seal in a portion of the inlet funnel (feed water section) above the sealing surface and the filtered water is collected in a portion (filtrate section) below the sealing surface, the invention is of course to be understood to include every arrangement that allows for separately measuring the water characteristics mentioned above before and after filtration, whether these measurements take place above or below the sealing surface.

The problem of the invention is also solved by a filter cartridge, in particular a gravity-operated filter cartridge, for a filtration device, the filter cartridge comprising a casing having ion-exchange resin therein, the casing having a water inlet and a water outlet. The filter cartridge is characterised in that it comprises a bridging element configured such that the bridging element opens or closes a control gap of an electrical circuit when the filter cartridge is located in a cartridge seat of the filtration device.

The bridging element is preferably an element distinctive from the sealing rim.

The filter cartridge according to the invention can generally have any of the features mentioned above with regard to the filter cartridge. Most preferably, the bridging element of the filter cartridge comprises an electrically conductive element for closing the control gap.

The problem of the invention is also solved by a filtration assembly, in particular a gravity-operated filtration assembly, the filtration assembly comprising an inlet funnel with a cartridge seat and a sensing apparatus comprising sensing means for measuring at least one water characteristic. The filtration assembly is characterised in that the sensing apparatus comprises an electrical circuit with a control gap configured such that the control gap is electrically opened or closed by a bridging element when a filter cartridge comprising the bridging element is located in the cartridge seat.

The filtration assembly preferably comprises a receptacle, in which the inlet funnel can be placed.

The problem of the invention is also solved by a method for operating a sensing apparatus in a filtration device, in particular in a gravity-operated filtration device, the sensing apparatus comprising sensing means for measuring at least one water characteristic. The method is characterised in that the sensing apparatus comprises an electrical circuit with a control gap and the control gap is opened or closed by placing a filter cartridge into a cartridge seat of the filtration device. Preferably, the filter cartridge is placed in the cartridge seat such that a bridging element of the filter cartridge is arranged at the control gap, thus closing the electrical circuit.

If the sensing apparatus is configured to measure above and below the cartridge seat, a comparison between the measured values can be made by the control unit. In such cases the sensing apparatus may check whether the water treatment leads to a sufficient decrease in the characteristics, e. g. a difference greater than 50 µS/cm in conductivity. If this is not the case, the sensing apparatus may output a signal to be recognised by the user. In particular, the sensing apparatus may first check the decrease when a new, unused filter cartridge is placed in the cartridge seat. The decrease may be determined by taking the mean value of the first 5 to 10 measurements. If there is no or little decrease, the sensing apparatus may output a signal indicating that the filtration device is either not working properly or that the feed water already has low values regarding the characteristics. If the decrease at the beginning of the lifetime of a filter cartridge is sufficient, the sensing apparatus may measure the characteristics repeatedly during the lifetime in order to determine when the filter cartridge is used up. This is preferably determined by comparing the momentary decrease with the decrease at the beginning of the lifetime of the filter cartridge. If the decrease is below a threshold of what it originally was, e. g. below 30%, the sensing apparatus may output a signal indicating that the filter cartridge is used up.

Figure 1B:
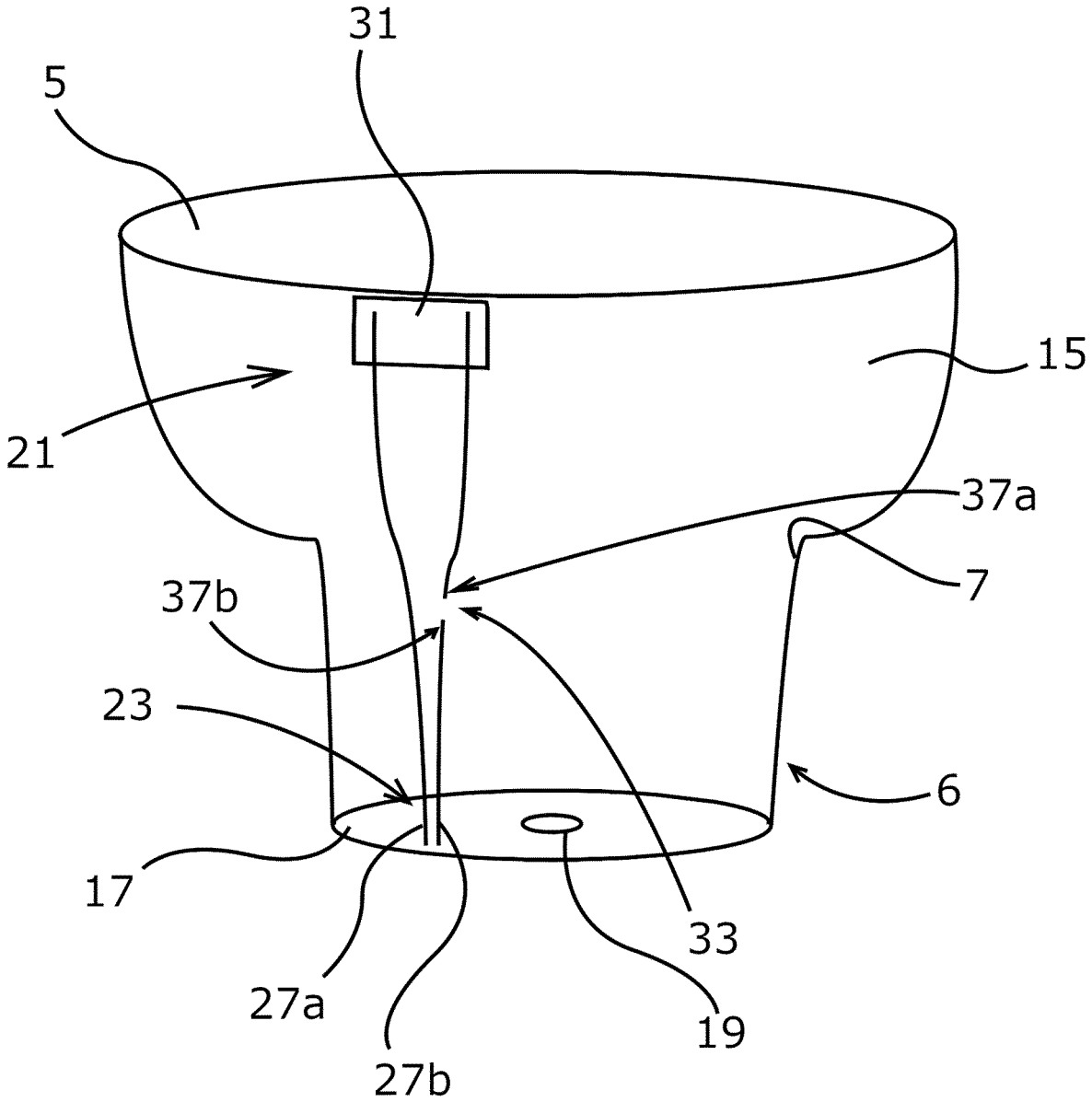
Figure 1C:
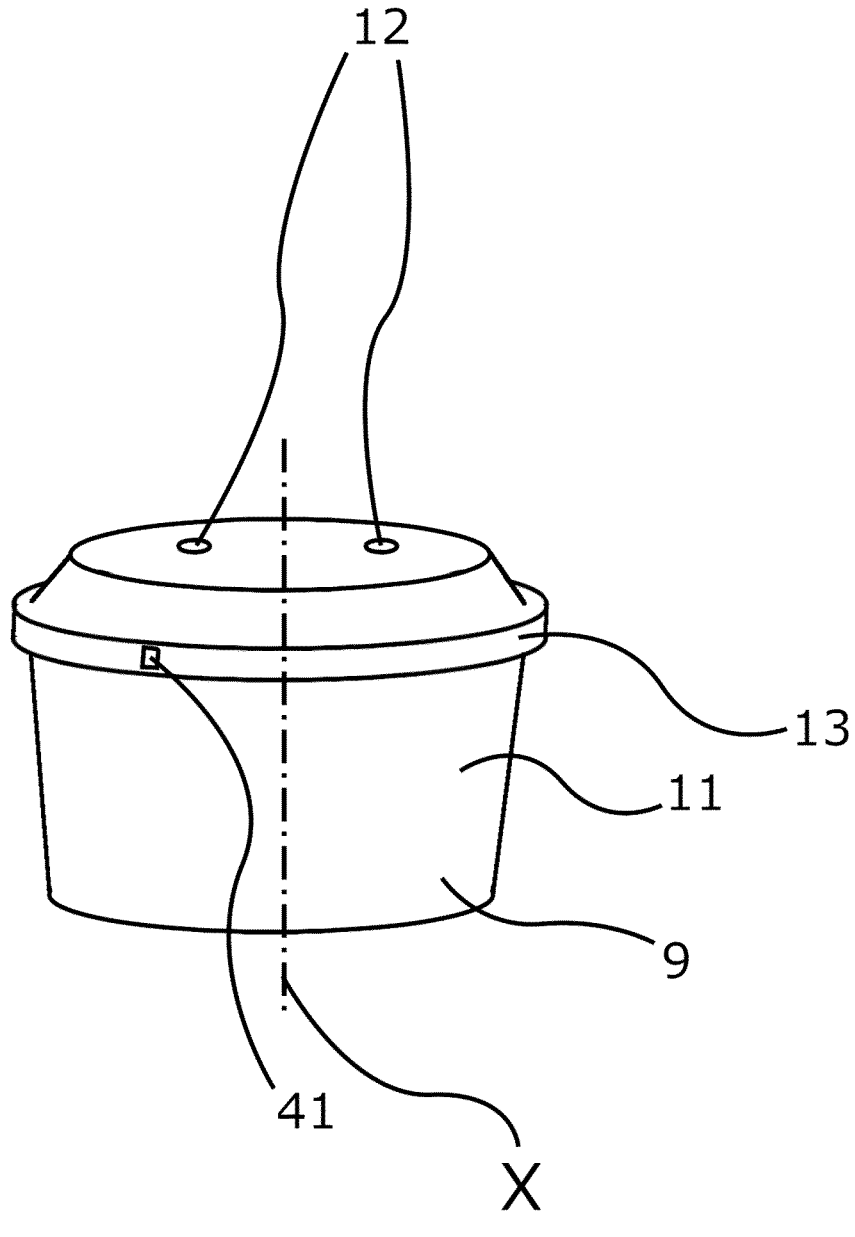
Figure 2:
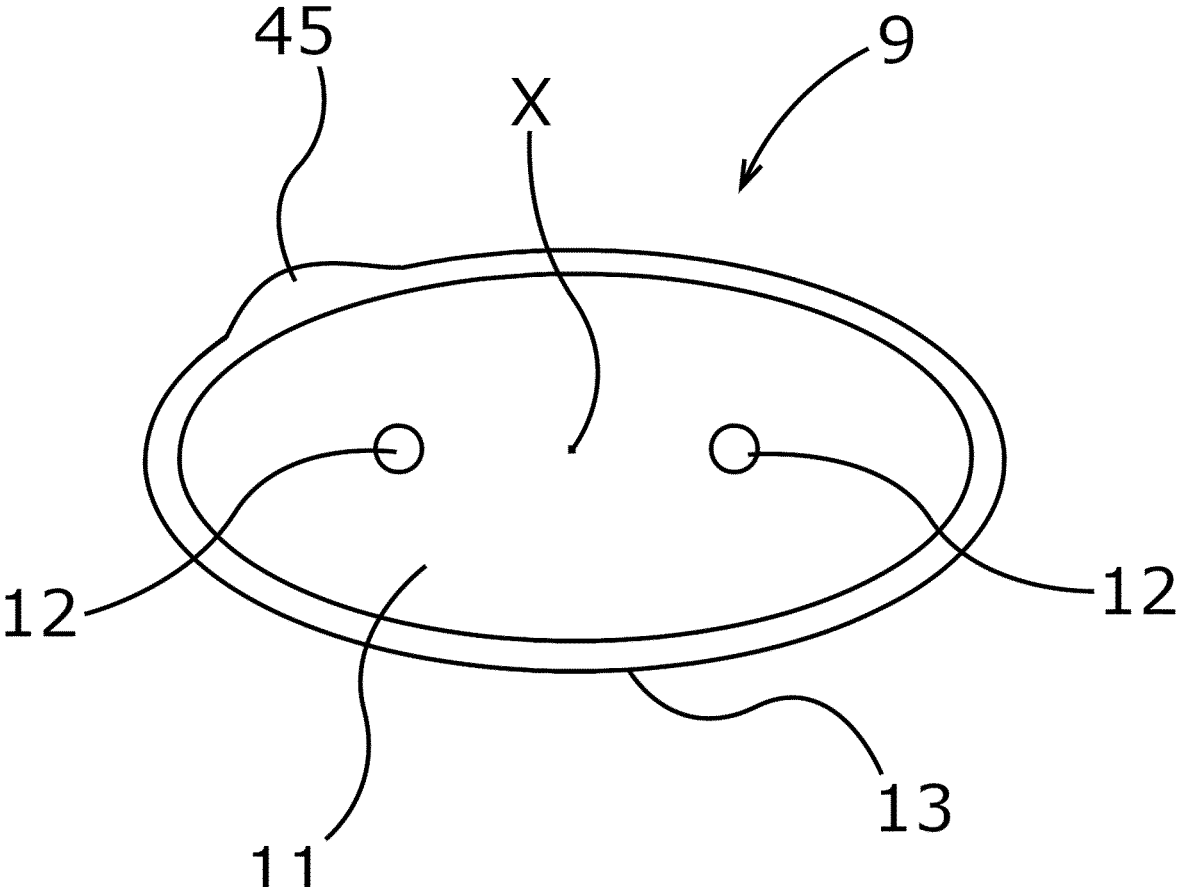
Figure 3:
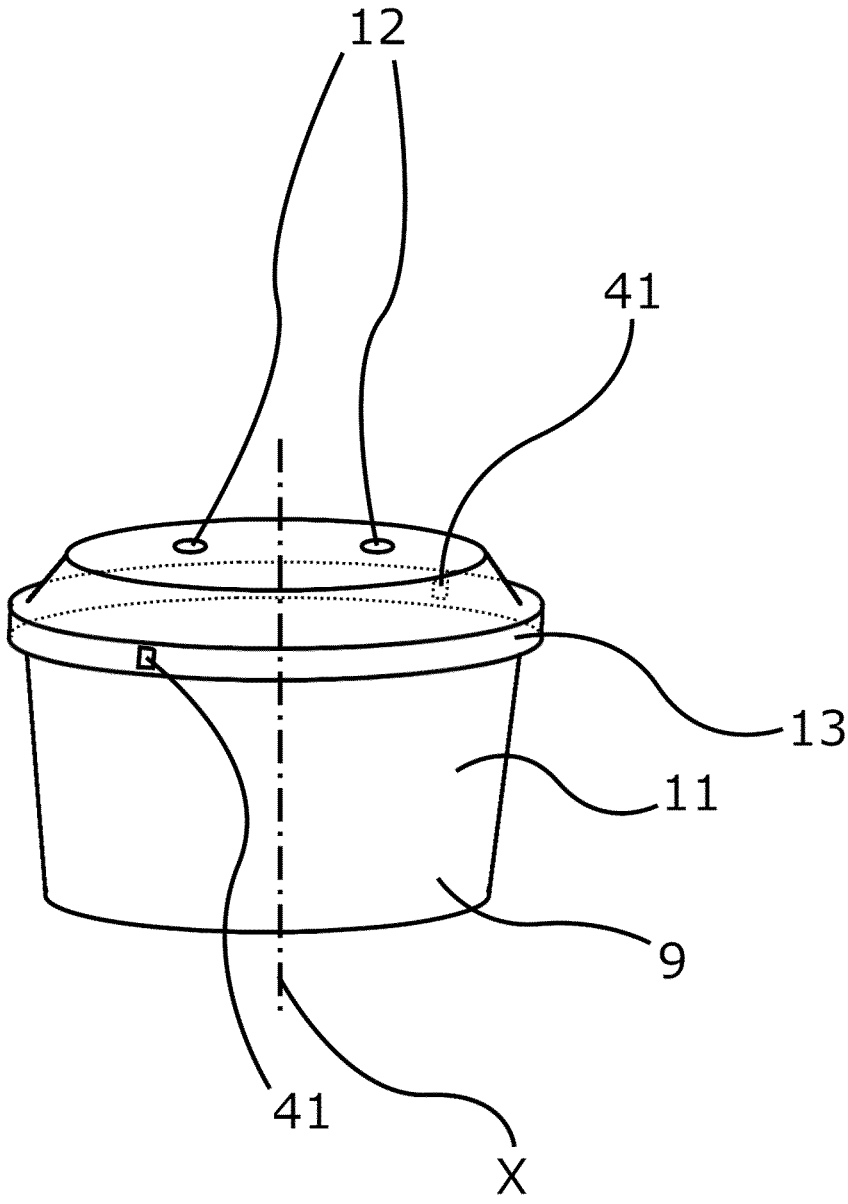

The invention will be described in detail with reference to the examples shown in the drawings, in which the following is shown:

FIG. 1a a filtration device according to the invention in a perspective view;

FIG. 1b the inlet funnel of the filtration device according to FIG. 1a;

FIG. 1c the filter cartridge of the filtration device according to FIG. 1a;

FIG. 2 another embodiment of a filter cartridge according to the invention in a top view;

FIG. 3 another embodiment of a filter cartridge according to the invention in a perspective view.

The gravity-operated filtration device 1 shown in FIG. 1a comprises an inlet funnel 5, which can be removably placed in a receptacle (not shown). The receptacle can generally come in many shapes, such as a carafe or a box-like container.

The inlet funnel 5 also shown in FIG. 1b has a cartridge seat 6, into which a filter cartridge 9 can be removably placed. The cartridge seat 6 is of a generally cylindrical shape having an oval base in this embodiment. The cartridge seat 6 has a circumferential sealing surface 7 of a generally oval shape in its upper region.

The filter cartridge 9 also shown in FIG. 1c comprises a casing 11, in which water treatment media (not visible) is arranged. The water treatment media may comprise ion exchange resin and/or active coal. At its top the casing 11 comprises water inlets 12 and at its bottom the casing 11 comprises water outlets (not visible). The position and size of the water inlets 12 is shown only exemplarily. In other embodiments, the water inlets 12 may be placed in different locations or may have different shapes and/or sizes. The casing 11 may additionally have air outlets (not shown) at its top. The casing 11 further comprises a sealing rim 13 around its circumference. The sealing rim 13 extends symmetrically around a main vertical axis X of the filter cartridge 9. The sealing rim 13 interacts with the sealing surface 7 of the cartridge seat 6 such that water coming from above enters the filter cartridge 9 through the water inlets and does not flow around the filter cartridge 9.

Above the sealing surface 7 the inlet funnel 5 comprises a feed water section 15, into which water that is to be treated (feed water) can be poured. This water then enters into the filter cartridge 9, where it is treated.

Below the sealing surface 7 the inlet funnel 5 comprises a filtrate section 17, into which filtered water (filtrate) flows before flowing further down through a funnel outlet 19 into the receptacle. The filtrate is thus collected in the receptacle and can then be poured out by a user.

The gravity-operated filtration device 1 further comprises a sensing apparatus 21. The sensing apparatus 21 comprises a sensing means 23 for measuring at least one water characteristic. In other embodiments the sensing apparatus 21 may comprise more than one sensing means 23. The inlet funnel 5 and the sensing apparatus together define a filtration assembly.

The sensing means 23 comprises two electrodes 27a,b that are arranged in the filtrate section 17. The electrodes 27a,b enable the sensing means 23 to measure the conductivity of the filtrate around the electrodes 27a,b. One of the electrodes 27a of the sensing means 23 is connected directly to a control unit 31 of the sensing apparatus 21. Between the other electrode 27b and the control unit 31 the sensing apparatus 21 comprises a control gap 33. The control unit 31 and the electrodes 27a,b thus form an electrical circuit of the sensing apparatus 21 having said control gap 33. Due to the control gap 33 the connection between the electrode 27b and the control unit 31 is broken. Coming from the control unit 31 the connection ends in connection point 37a. Coming from the electrode 27b the connection ends in connection point 37b. In the state shown in FIG. 1b the sensing apparatus 21 cannot measure the conductivity of the filtrate via the sensing means 23 and the control unit 31 due to the control gap 33.

FIG. 1a shows the interaction of a filter cartridge 9 with the sensing apparatus 21 when it is placed in the cartridge seat 6. The filter cartridge 9 comprises a bridging element 41 in the form of a conductive element, e. g. a metal strip or conductive polymer. When the filter cartridge 9 is placed in the cartridge seat 6 the bridging element 41 interacts with the control gap 33 such that it closes the control gap 33 and closes the connection between the control unit 31 and the electrode 27b. The sensing apparatus 21 is then operable and the conductivity in the filtrate section 17 can be measured.

The control unit 31 comprises a display (not shown), on which information regarding the conductivity measured is shown.

The filter cartridge 9 shown in FIG. 2 comprises a casing 11 having water inlets 12 at its top. A main vertical axis X of the filter cartridge 9 extends perpendicular to the drawing plane. Water treatment media (not shown) is arranged inside the casing 11. The filter cartridge 9 comprises a circumferential sealing rim 13, which is asymmetrical with regard to the main vertical axis X having an asymmetrical element 45 in the form of a bump.

The filter cartridge 9 shown in FIG. 3 is similar to the filter cartridge 9 shown in FIG. 1c. It has a casing 11 having water inlets 12 at its top and water outlets (now visible) at its bottom. The casing 11 is provided with a circumferential sealing rim 13. In the embodiment of the filter cartridge 9 shown in FIG. 3 the sealing rim 13 is two-fold rotationally symmetrical around the main vertical axis X of the filter cartridge 9. Two bridging elements 41 are arranged on the sealing rim 13. The bridging elements 41 are arranged two-fold rotationally symmetrically around the main vertical axis X.

LIST OF REFERENCES 1 filtration device
5 inlet funnel
6 cartridge seat
7 sealing surface
9 filter cartridge
11 casing
12 water inlet
13 sealing rim
15 feed water section
17 filtrate section
19 funnel outlet
21 sensing apparatus
23 first sensing means
27a electrode 27b electrode
31 control unit
33 control gap
37a connection point
37b connection point
41 bridging element
45 asymmetric element
X main vertical axis

The invention claimed is:

1. A filtration device comprising an inlet funnel with a cartridge seat, a filter cartridge placeable in the cartridge seat, and a sensing apparatus comprising sensing means for measuring at least one water characteristic, wherein the sensing apparatus comprises an electrical circuit with a control gap and the filter cartridge comprises a bridging element, wherein the bridging element is arranged such that it electrically opens or closes the control gap when the filter cartridge is located in the cartridge seat.

2. The filtration device according to claim 1, wherein the bridging element comprises an electrically conductive element for electrically closing the control gap.

3. The filtration device according to claim 2, wherein the conductive element is located in or on a sealing rim of the filter cartridge.

4. The filtration device according to claim 2, wherein the conductive element comprises conductive polymer.

5. The filtration device according to claim 1, wherein the inlet funnel comprises a conductive element for electrically opening or closing the control gap and in that the bridging element is configured to act on the conductive element when the filter cartridge is located in the cartridge seat such that the conductive element opens or closes the control gap, wherein the conductive element is included in a mechanical switch configured to open and close the electrical circuit, and in that the bridging element is configured to act on the mechanical switch such that the switch is opened or closed when the filter cartridge is located in the cartridge seat.

6. The filtration device according to claim 1, wherein a sealing rim of the filter cartridge is n-fold rotationally symmetrical about a main vertical axis of the filter cartridge and comprises n bridging elements arranged symmetrically on the sealing rim with regard to the vertical axis, with $n \geq 2$.

7. The filtration device according to claim 1, wherein a sealing rim of the filter cartridge is rotationally asymmetrical about its main vertical axis.

8. The filtration device according to claim 1, wherein the sensing apparatus is configured to measure at least one of a filling level, water conductivity, total dissolved solids, the level of Ca, Mg, Na, K, Chloride, Nitrates, Sulphates, and Cu or a combination thereof.

9. The filtration device according to claim 1, wherein the sensing apparatus comprises at least two separate sensing means, wherein at least one of the sensing means is operable only when the control gap is closed.

10. The filtration device according to claim 9, wherein one of the sensing means is arranged in the inlet funnel above a sealing surface of the cartridge seat and one of the sensing means is arranged in the inlet funnel below the sealing surface.

* * * * *